United States Patent Office 2,880,054

Patented Mar. 31, 1959

2,880,054

PROCESS FOR REACTING WOOL WITH ORGANIC DIISOCYANATES IN THE PRESENCE OF A TERTIARY AMINE

Joseph E. Moore, Berkeley, Calif., assignor to the United States of America as represented by the Secretary of Agriculture No Drawing. Application May 21, 1956
Serial No. 586,331

3 Claims. (Cl. 8—127.6)

(Granted under Title 35, U. S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to the chemical modification of wool. More particularly, the invention concerns the treatment of wool with organic di-isocyanates whereby to produce modified wools which have properties superior to those of the natural, untreated wool. The objects of the invention are concerned not only with the processes whereby such chemical modifications are effectuated but also with the novel modified wool fibers produced by such chemical action. Further objects and advantages of the invention will be obvious from the following description.

In essence, the process of this invention involves reacting wool with an organic di-isocyanate in the presence of a tertiary amine, preferably pyridine. Usually, the pyridine is applied in excess so as to function as a solvent for the di-isocyanate reagent and as a catalyst for the reaction. Instead of using pyridine as the sole solvent, it may be replaced in part by any inert volatile solvent such as benzene, toluene, carbon tetrachloride, chloroform, ethylene dichloride and so forth. Although pyridine is preferred as the reaction promoter, one can use other tertiary amines such as dimethyl aniline, quinoline, and N-ethyl piperidine. The reaction is conducted under essentially anhydrous conditions and at a temperature from about 20 to 120° C. Usually to increase the rate of reaction, it is conducted under refluxing conditions at about 110–120° C. The degree of modification of the wool is influenced by the proportion of di-isocyanate taken up by the fiber, that is, the higher the uptake of di-isocyanate the greater will be the modification of the fiber. In general, the uptake of di-isocyanate may be varied from about 0.1% to 20%. In conducting the reaction, the di-isocyanate reactant is generally employed in excess over the amount desired to be taken up by the fiber in order to increase the rate of reaction. The time of reaction will vary depending on the temperature of reaction, the reactivity of the di-isocyanate selected and the degree of modification desired. In general, the reaction may take anywhere from less than an hour to 24 hours or more. It is obvious that such treatment conditions as concentration of di-isocyanate, time and temperature of reaction are not critical but may be modified to suit individual circumstances without changing the basic nature of the invention.

Typical examples of di-isocyanates which may be used in accordance with this invention are listed below by way of illustration but not limitation:

Phenylene di-isocyanate,
Toluene di-isocyanate,
Cyclohexylene di-isocyanate,

Ethylene di-isocyanate,
Propylene di-isocyanate,
Butylene di-isocyanate,
Trimethylene di-isocyanate,
Tetramethylene di-isocyanate,
Hexamethylene di-isocyanate,
Octamethylene di-isocyanate,
Decamethylene di-isocyanate,
4-isocyanoethyl-phenyl isocyanate,
Diphenylmethane-4,4′-di-isocyanate,
3,3′-bitolylene-4,4′-di-isocyanate, etc.

Many of the di-isocyanate reactants which may be used in this process can be represented by the formula—

$$OCN—R—NCO$$

wherein R represents a hydrocarbon radical.

After the reaction of the wool with the di-isocyanate, the chemically modified fiber is mechanically treated as by wringing, centrifugation, or the like to remove excess reagent and solvent. Residual, unreacted di-isocyanate and reaction by-products are then removed from the fiber by washing with an inert solvent such as benzene, acetone, carbon tetrachloride, etc. In most cases it is also preferable to wash the reacted fiber with alcohol and/or water to remove reaction products and other undesired materials. The treated fiber is then dried in the usual way.

By treating wool with the di-isocyanate reagent as above described, the wool is chemically modified because there is a chemical reaction between the di-isocyanate and the protein molecules of the wool fibers. It is believed that the chemical reaction which occurs involves cross-linking, that is, protein molecules are joined to one another through the di-isocyanate. That cross-linking occurs is borne out by the fact that the chemically modified wool displays a decreased degree of supercontraction. Thus the chemically modified fibers when subjected to reducing agents which are capable of splitting disulphide bonds, contract to a much lesser extent than do the original fibers under the same conditions. In addition, the chemically modified wool displays a drastically decreased tendency to shrink when subjected to laundering operations. Also, the di-isocyanate-reacted wool exhibits greater resistance to alkaline and acid reagents as indicated by its decreased solubility in these reagents. This factor enables the modified wool to be useful in applications where the product would come into contact with alkaline or acid materials. A further point is that the di-isocyanate treatment in accordance with this invention does not impair the wool fiber for its intended purpose, that is, for producing woven or knitted textiles, garments, etc. Thus the di-isocyanate treatment does not adversely affect the tensile strength, hand, or color of the wool.

The process of the invention may be applied to wool in the form of fibers, as such, or in the form of thread, yarns, sliver, knitted or woven goods.

The invention is further demonstrated by the following example.

*Example*

A lot of 8¼ oz. white woolen flannel was thoroughly solvent-extracted and divided into samples of approximately 2 grams weight. Each sample of cloth was treated as follows: The wool cloth was dried in an oven at 105° C. for several hours then transferred to a round-bottomed flask equipped with a reflux condenser and drying ($CaCl_2$) tube. Dry pyridine was added to the flask and heat was applied. When the appropriate temperature was reached (as set forth below), the di-isocyanate was added. Eighteen ml. of pyridine and 2 ml. of di-isocyanate per gram of wool were used throughout the experiments. After the reaction was completed, the chemically modified wool was removed from the reaction system and washed successfully with carbon tetrachloride, alcohol, and water and then dried.

The reagents employed, the conditions of reaction, and the uptakes of di-isocyanate are set forth in the following table.

| Expt. No. | Reagent | Temperature of reaction, ° C. | Time of reaction, hrs. | Uptake of diisocyanate, percent |
|---|---|---|---|---|
| 2 | Toluene-2,4-diisocyanate | 115–118 | 1.0 | 3.4 |
| 3 | do | 115–118 | 6.0 | 8.0 |
| 4 | Hexamethylene diisocyanate | 115–118 | 0.5 | 4.2 |
| 5 | do | 115–118 | 7.0 | 19.0 |

The treated wool samples and samples of the untreated wool (control) were subjected to various tests as described below to determine the effectiveness of the chemical modification.

*Acid solubility.*—Determined by immersing the wool in 4 N HCl for one hour at 65° C. The loss in weight was determined after washing with two liters of water.

*Alkali solubility.*—Determined by immersing the wool in 0.1 N NaOH for one hour at 65° C. The loss in weight was determined after washing with two liters of water.

*Solubility in ammonia after treatment with peracetic acid.*—400 mg. of wool were treated for 25 hours with 100 ml. of 2% peracetic acid and finally with 100 ml. of 0.3% ammonium hydroxide. The loss in weight was determined after thorough washing with water.

*Shrinkage.*—The wool samples were milled at 1500 r.p.m. for 4 minutes at 40–42° C. in an "accelerotor" with 0.5% sodium oleate solution, using a liquor to wool ratio of 50 to 1. After this laundering operation the samples were measured to determine their area.

*Degree of supercontraction.*—Determined by measuring the length of the wool fiber before and after being immersed in 5% sodium bisulphite at 100° C. for one hour. The supercontraction is the percentage proportion of (*a*) the decrease in length after treatment with the disulphite bond-breaking reagent (sod. bisulphite) to (*b*) the original length of the fiber. Thus this property of the wool is an index of cross-linking of the protein molecule; the less the contraction after treatment with the reducing agent, the greater is the degree of cross-linking.

The reagents used and the results obtained are set forth in the following table:

| Expt. No. | Di-isocyanate reactant | Uptake of di-isocyanate, percent | Acid solubility, percent | Alkali solubility, percent | Solubility in peracetic acid-$NH_3$, percent | Supercontraction, percent | Area shrinkage, percent |
|---|---|---|---|---|---|---|---|
| 1 | none (control) | none | 8.8 | 12.4 | 83 | 27 | 40 |
| 2 | Toluene-2,4-diisocyanate | 3.4 | 2.2 | 6.6 | 46 | 7.7 | 16 |
| 3 | do | 8.0 | 1.0 | 4.6 | 16 | 6.4 | 9 |
| 4 | Hexamethylene diisocyanate | 4.2 | 2.1 | 7.0 | 33 | 11 | 23 |
| 5 | do | 19.0 | 0 | 2.8 | 2 | 0 | 7 |

Having thus defined the invention, what is claimed is:

1. A process for chemically modifying wool which comprises reacting wool under essentially anhydrous conditions, in the presence of a tertiary amine selected from the group consisting of pyridine, dimethyl aniline, quinoline, and N-ethyl piperidine, at a temperature about from 20 to 120° C., with an organic di-isocyanate of the formula

OCN—R—NCO wherein R represents a hydrocarbon radical selected from the group consisting of the phenylene radical —$C_6H_4$—, the toluylene radical

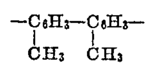

the cyclohexylene radical —$C_6H_{10}$—, a saturated alkylene radical of the formula —$C_nH_{2n}$— wherein $n$ is an integer from 2 to 10, the ethyl-phenyl radical —$C_2H_4$—$C_6H_4$—, the diphenylmethane radical —$C_6H_4$—$CH_2$—$C_6H_4$—, and the bitolylene radical $$-\underset{\displaystyle CH_3}{\underset{|}{C_6H_3}}-\underset{\displaystyle CH_3}{\underset{|}{C_6H_3}}-$$

until the wool combines with about from 0.1 to 20% of its weight of the di-isocyanate.

2. The process of claim 1 wherein the di-isocyanate is toluene-2,4-di-isocyanate.

3. The process of claim 1 wherein the di-isocyanate is hexamethylene di-isocyanate.

References Cited in the file of this patent

UNITED STATES PATENTS 2,482,578 Doggett ............ Sept. 20, 1949

FOREIGN PATENTS 586,549 Great Britain ............ Mar. 24, 1947

OTHER REFERENCES

Barr: Society of Dyers and Colorists, vol. 62, November 1946, pp. 338–345.

Farnworth: Biochemical Journal, April 1955, pages 529–533.